United States Patent [19]

Shimizu

[11] Patent Number: 4,948,343

[45] Date of Patent: Aug. 14, 1990

[54] SLANT-PLATE TYPE COMPRESSOR WITH ADJUSTABLY POSITIONABLE DRIVE SHAFT

[75] Inventor: Shigemi Shimizu, Sakai, Japan

[73] Assignee: Sanden Corporation, Gunma, Japan

[21] Appl. No.: 327,727

[22] Filed: Mar. 23, 1989

[30] Foreign Application Priority Data

Mar. 23, 1988 [JP] Japan .............................. 63-37069[U]

[51] Int. Cl.⁵ .............................................. F04B 1/26
[52] U.S. Cl. .................. 417/222 S; 417/270; 92/12.2
[58] Field of Search ............ 417/222, 269, 270, 222 S; 92/12.2, 60.5, 71, 65; 91/506

[56] References Cited

U.S. PATENT DOCUMENTS

| | | | |
|---|---|---|---|
| 1,970,133 | 8/1934 | Ferris et al. | 91/505 |
| 2,962,970 | 12/1960 | Norlin | 417/270 |
| 3,450,058 | 6/1969 | Stein | 92/71 |
| 4,586,874 | 5/1986 | Hiraka et al. | 417/270 |
| 4,632,640 | 12/1986 | Terauchi | 417/269 |
| 4,664,604 | 5/1987 | Terauchi | 417/270 |
| 4,842,488 | 6/1989 | Terauchi | 417/269 |

*Primary Examiner*—Leonard E. Smith
*Assistant Examiner*—John A. Savio, III
*Attorney, Agent, or Firm*—Banner, Birch, McKie & Beckett

[57] ABSTRACT

A slant-plate type compressor including a compressor housing having a cylinder block as disclosed. A plurality of peripherally located cylinders are formed around the cylinder block, and a central bore is formed through the cylinder block. A piston is slidably fitted in each of the cylinders and is reciprocated by a drive mechanism. The drive mechanism includes a drive shaft rotatably supported in the compressor housing, and having one axial end terminating in the central bore. A rearward portion of the central bore is threaded, and an adjusting screw is screwed into the rear portion to adjust the axial position of the drive shaft within the central bore. A spacer is disposed between the inner axial end surface of the drive shaft and the adjusting screw. The spacer includes a plurality of radial projections extending from a peripheral surface, and fitting into corresponding depressions formed in the interior surface of the central bore. The spacer prevents rotational motion of the drive shaft from being transferred to the adjusting screw. Therefore, the position of the adjusting screw and the drive shaft during rotational motion of the drive shaft is constantly maintained.

7 Claims, 3 Drawing Sheets

SLANT-PLATE TYPE COMPRESSOR WITH ADJUSTABLY POSITIONABLE DRIVE SHAFT

BACKGROUND OF THE INVENTION

1. Field of the Invention

The present invention is directed to a refrigerant compressor, and more particularly, to a slant-plate type compressor, such as a wobble-plate type compressor, suitable for use in an automotive air-conditioning system.

2. Description of the Prior Art

Wobble-plate type compressors for use in an automotive air-conditioning system are well known in the art as disclosed in U.S. Pat. No. 4,586,874, hereby incorporated by reference, corresponding to Japanese patent application publication No. 60-135680, and shown in FIG. 1. Wobble-plate type compresser 10 includes closed cylindrical housing assembly 11 including cylinder block 111 having an open end, front end plate 13 disposed on the open end of cylinder block 111, and rear end plate 14 disposed on an opposite end of cylinder block 111. Cylinder block 11 includes a plurality of peripherally disposed cylinders 101 formed therethrough at a rearward portion, and a peripheral wall extending forward of the rearward portion to the open end. Front end plate 13 encloses crank chamber 12 within cylinder block 111, forward of the location of cylinders 101. Central bore 112 is formed through a central location of the rearward portion.

Drive shaft 15 extends through an opening in front end plate 13, and into central bore 112 formed in cylinder block 111. Drive shaft 15 is rotatably supported within central bore 112 by a bearing, such as radial needle bearing 16. Threaded portion 112a of central bore 112 is located to the rear of the inner axial end surface of drive shaft 15. Adjusting screw 17 is screwed into threaded portion 112a of central bore 112 such that rotation of screw 17 canges its axial position in bore 112. Thus, the axial position of drive shaft 15 can be adjusted as well by rotating adjusting screw 17.

Spring member 18 is disposed between the axial end surface of drive shaft 15 and adjusting screw 17. Additionally, thrust needle bearing 19 is disposed between the axial end surface of drive shaft 15 and spring member 18, assuring smooth rotation of drive shaft 15 within central bore 112. Bearing 19 also prevents the transfer of rotational motion from drive shaft 15 to adjusting screw 17 via spring member 18. Therefore, adjusting screw 17 maintains its axial position during operation of the compressor and, the axial position of drive shaft 15 will not be unintentionally adjusted during compressor operation. However, thrust needle bearing 19 is expensive, and the use of a thrust needle bearing in the compressor not only increases the cost of the compressor, but also complicates the process of assembling the compressor.

SUMMARY OF THE INVENTION

It is an object of this invention to provide a slant-plate type compressor having an adjustably axially positionable drive shaft such that the axial position of the drive shaft is maintained during operation of the compressor.

A slant-plate type compressor in accordance with the present invention includes a compressor housing having a cylinder block with a front end plate attached at one open end of the cylinder block, and a rear end plate attached to the rear end of the cylinder block. A plurality of cylinders are formed through a rear portion of the cylinder block at a peripheral location. A peripheral wall extends forward of the rear portion and terminates at the open end of the cylinder block. The front end plate encloses a crank chamber within the cylinder block, forward of the location of cylinders. A central bore is formed through the cylinder block at a central location. A piston is slidably fitted within each of the cylinders, and a drive mechanism is coupled to the pistons to reciprocate the pistons within the cylinders.

The drive mechanism includes a drive shaft rotatably supported through the front end plate and extending into the central bore and a coupling mechanism coupling the shaft to the pistons such that rotational motion of the shaft is converted into reciprocating motion of the pistons. The coupling mechanism includes a cam rotor fixed to the drive shaft and rotatable therewith, and a slant plate disposed around the drive shaft at an adjustable inclined angle relative to the longitudinal axis of the drive shaft. The slant plate is adjustably linked to the cam rotor such that the inclined angle may be changed. The slant plate rotates with the rotor. A wobble plate is nutatably disposed on the slant plate and is linked to connecting rods attached to the pistons. Rotation of the drive shaft causes rotation of the cam rotor and the slant plate, causing the wobble plate to nutate and reciprocate the pistons in the cylinders.

The central bore of the cylinder block includes a threaded portion located behind the inner axial end surface of the drive shaft. A screw member is screwed into the bore at the threaded portion, and rotation of the screw member adjusts its axial position within the central bore. A spacing member is non-rotatably disposed between the axial end surface of the drive shaft and the screw member. Adjustment of the position of the screw member simultaneously adjusts the position of the drive shaft within the central bore. The spacing member acts as a rotation preventing device, preventing the transfer of rotational motion from the drive shaft to the screw member. The spacing member thereby prevents unintentional axial movement of the screw member and the drive shaft within the central bore. The spacing member includes at least one radial projection formed on the peripheral surface, and fitting into a corresponding depression formed on an interior surface of the central bore to prevent rotation of the spacing member.

Further objects, features, and other aspects of this invention will be understood from the following detailed description of the preferred embodiment of this invention with reference to the annexed drawings.

DETAILED DESCRIPTION OF THE PREFERRED EMBODIMENT

Figure 1:
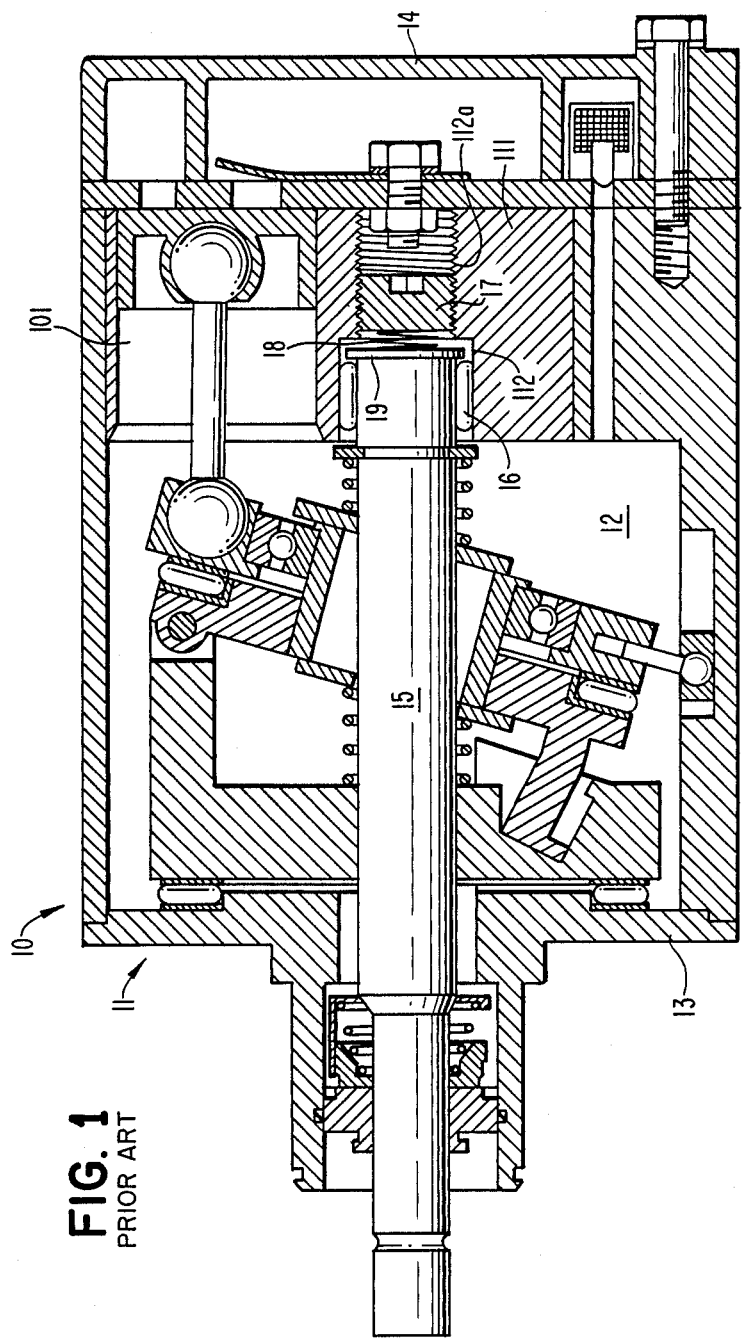
FIG. 1 is a vertical sectional view of a slant-plate type compressor in accordance with the prior art.
Figure 2:
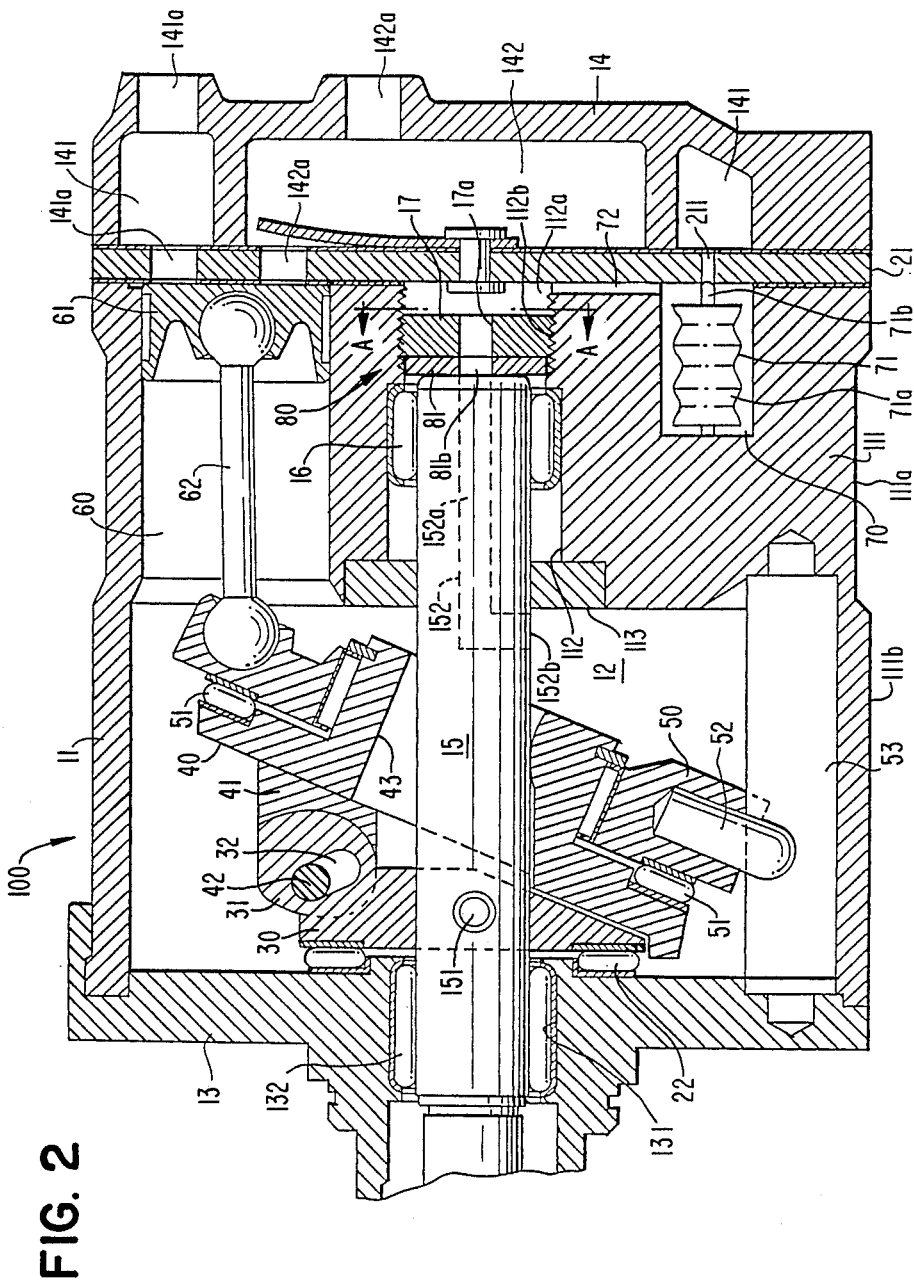
FIG. 2 is a vertical sectional view of a slant-plate type compressor in accordance with the present invention.

FIG. 2 illustrates a slant-plate type refrigerant compressor in accordance with the present invetion. In FIG. 2, for purposes of explanation only, the left side will be referenced as the front or forward side and the right side will be referenced as the rearward side. The same reference numerals are used in FIG. 2 to denote corresponding elements shown in the prior art compressor of FIG. 1. Additionally, although the compressor is described with respect to FIGS. 2–5 as a wobble-plate type compressor, the invention is not limited thereto. The present invention is applicable to any type of slant-plate type compressor, including both fixed and variable capacity, wobble or swash-plate type compressors.

Compressor 100 includes cylindrical housing assembly 11 further including cylinder block 111, front end plate 13 disposed at one open end of cylinder block 111, and rear end plate 14 attached to the other end of clyinder block 111. Cylinder block 111 includes rear portion 111a, and forward peripheral wall 111b extending from portion 111a and terminating in the open end surface. A plurality of cylinders 60 are formed through the periphery of rear portion 111a. Front end plate 13 encloses crank chamber 12 within cylinder block 111, forward of rear portion 111a. Both front end plate 13 and rear end plate 14 are secured to cylinder block 111 by a plurality of bolts (not shown). Discharge chamber 142 is centrally formed in rear end plate 14, and suction chamber 141 is formed within rear end plate 14, and is located around discharge chamber 142. Valve plate 21 is disposed between rear end plate 14 and cylinder block 111.

Front end plate 13 includes central opening 131 formed therethrough. Drive shaft 15 is supported within opening 131 by bearing 132. Central bore 121 is formed through a central location of rear portion 111a of cylinder block 111. The inner axial end surface of drive shaft 15 is rotatably supported within central bore 112 by bearing 16. Bore 112 includes rear screw threaded portion 112b extending partially across the length of central bore 112. The forward end of bore 112 is enclosed by supporting element 113. Portion 112b surrounds rear chamber 112a of bore 112.

Cam rotor 30 is disposed around drive shaft 15 and is fixedly attached to drive shaft 15 by pin member 151. Cam rotor 30 rotates with drive shaft 15. Thrust needle bearing 22 is disposed between the inner end surface of front end plate 13, and the adjacent axial end surface of cam rotor 30. Cam rotor 30 includes arm 31 having slot 32 therein. Slant plate 40 includes opening 43, through which drive shaft 15 is disposed. Slant plate 40 is disposed adjacent cam rotor 30, and includes arm 41 having pin member 42 extending therefrom. Cam rotor 30 and slant plate 40 are coupled by pin member 42 which is inserted in slot 32 to form a hinged joint. Pin member 42 is slidable in slot 32 to allow adjustment of the inclined angle of slant plate 40 with respect to the longitudinal axis of drive shaft 15.

Wobble plate 50 is mounted around a forward projecting surface of slant plate 40. Bearing 51 is disposed between slant plate 40 and wobble plate 50 allowing slant plate 40 to rotate with respect to wobble plate 50. Rotational motion of slant plate 40 causes nutating or wobbling motion of wobble plate 50. Fork-shaped slider 52 is attached to the lower peripheral end surface of wobble plate 50, and is slidably mounted on sliding rail 53. Sliding rail 53 is fixedly disposed between front end plate 13 and cylinder block 111. During nutation of wobble plate 50, slider 52 slides along rail 53, preventing rotation of wobble plate 50. Pistons 61 are slidably disposed within cylinders 60 of cylinder block 111, and are coupled to wobble plate 50 via corresponding connecting rods 62. Nutational motion of wobble plate 50 causes reciprocating motion of pistons 61 within cylinders 60.

Valve plate 21 is disposed between cylinder block 111 and rear end plate 14 and includes a plurality of valved suction ports 141a linking suction chamber 141 with respective cylinders 60. Additionally, valve plate 21 also includes a plurality of valved discharge ports 142a linking discharge chamber 142 with respective cylinders 60. Suction ports 141a and discharge ports 142a are provided with suitable reed valves as described in U.S. Pat. No. 4,011,029 to Shimizu, hereby incorporated by reference. Suction chamber 141 includes inlet portion 141b which is connected to an evaporator of an external cooling circuit (not shown). Discharge chamber 142 is provided with outlet portion 142b connected to a condenser of the external cooling circuit.

Drive shaft 15 includes passage 152 further including axial portion 152a extending from the inner axial end surface of drive shaft 15 to a location of drive shaft 15 forward of central bore 112. Additionally, passage 152 includes radial portion 152b opening into crank chamber 12. Radial conduit 72 is formed along a part of the rear end surface of cylinder block 111, adjacent valve plate 21. Conduit 72 is linked at one end to rear chamber 112a of central bore 112, and at the other end to hollow portion 70 formed within cylinder block 111.

Valve plate 21 includes hole 211 linking suction chamber 141 to hollow portion 70 at a location adjacent the end of contuit 72. Valve mechanism 71 is disposed in hollow portion 70 and includes bellows member 71a fixed at an end of hollow portion 70 opposite hole 211. Valve mechanism 71 also includes valve element 71b fixed on the opposite end of bellow member 71a, that is, the end of bellows member 71a located near opening 211. Therefore, valve element 71b opens and closes hole 211 to link chamber 112a to suction chamber 141 in accordance with the motion of bellows member 71a.

Adjusting screw 17 is screwed into threaded portion 112b of central bore 112; and includes a forward surface disposed adjacent the inner end surface of drive shaft 15. Circuit disc-shaped spacer 81 is disposed between the inner end surface of drive shaft 15 and adjusting screw 17. Axial movement of screw 17 due to rotation thereof causes spacer 81 to move axially within bore 112. As discussed below, rotation of spacer 81 within bore 112 is prevented. Axial movement of adjusting screw 17 is transferred to drive shaft 15 through spacer 81 so that all three elements move axially within bore 112.

Adjusting screw 17 comprises hexagonal hole 17a extending therethrough, and an appropriate hexagonally shaped spanning member is fitted through hole 17a to adjust the axial position of adjusting screw 17 by rotation thereof. Additionally, spacer 81 includes hole 81b extending therethrough. Hole 81b, portion 152a, and hole 17a are aligned, linking crank chamber 12 to rear chamber 112a. Since rear chamber 112a is further linked to hollow portion 70 through conduit 72, crank chamber 12 is linked to portion 70 to maintain portion 70 at crank chamber pressure. Thus there is a link between crank chamber 12 and suction chamber 141 through hole 211, conduit 72, chamber 112a, holes 17a and 81b, and passage 152. The link is controlled by valve mechanism 71 in response to the crank chamber pressure.

Figure 4:
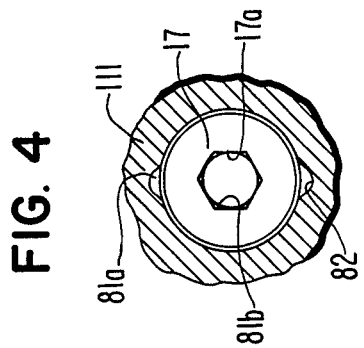
FIG. 4 is a cross-sectional view of the bore along line A—A of FIG. 2.
Figure 3:
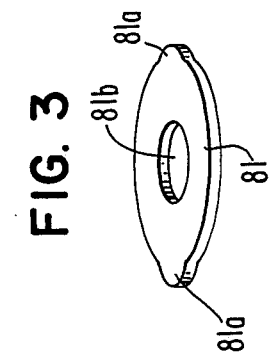
FIG. 3 is a perspective view of a spacing element shown in the compressor of FIG. 2.
Figure 5:
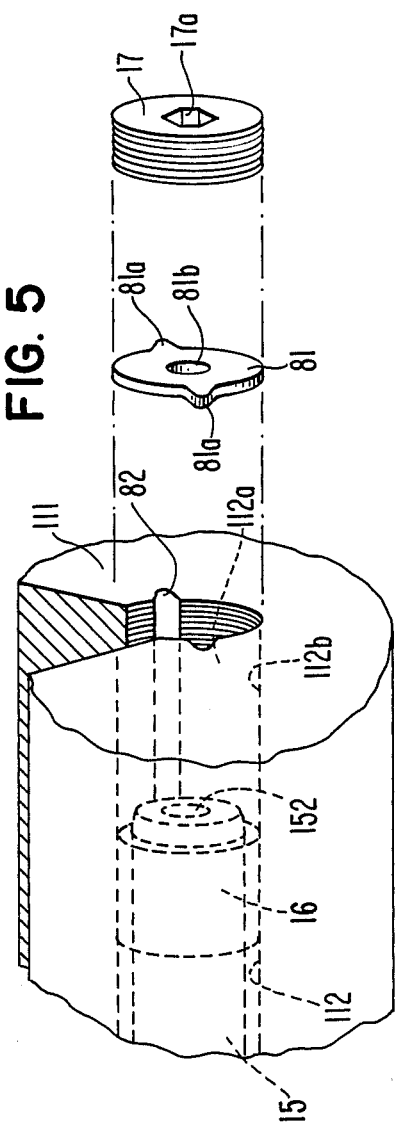
FIG. 5 is an expanded perspective view of the section of bore shown in FIG. 4.

With reference to FIGS. 3–5, rotation preventing device 80 for preventing rotation of adjusting screw 17 during operation of compressor 100 is shown. Device 80 includes spacer 81 having a pair of semi-circular shaped portions 81a radially projecting from opposite peripheral surfaces thereof. Spacer 81 is manufactured by press cutting the spacer out of sheet iron. Device 80 further includes a pair of semic-circular shaped depressions 82 formed on an interior peripheral surface of bore 112. Spacer 81 inserted into bore 112 such that projections 81a fit within depressions 82 to thereby prevent rotation of spacer 81 within bore 112. Therefore, rotational motion of drive shaft 15 is not transferred to adjusting screw 17 during operation of the compressor. Since unintentional rotation of screw 17 during comoressor operation is prevented, screw 17 and shaft 15 maintain their axial postions.

In operation of compressor 100, drive shaft 15 is rotated by the engine of the vehicle (not shown) through an electromagnetic clutch (not shown). As discussed above, rotation of drive shaft 15 causes pistons 61 to reciprocate in respective cylinders 60. As pistons 61 are reciprocated, refrigerant gas which is introduced into suction chamber 141 via inlet portion 141b, is drawn into cylinders 60 through suction ports 141a and is subsequently compressed. The compressed refrigerant gas is discharged from cylinders 60 to discharge chamber 142 through respective discharge ports 142a, and then to the external cooling circuit through outlet portion 142b.

Valve mechanism 71 disposed in hollow portion 70 is responsive to the crank chamber pressure. When the pressure in crank chamber 12 and thus hollow portion 70 exceeds a predetermined value, bellows member 71a contracts, removing valve element 71b from hole 211. Thus, crank chamber 12 and suction chamber 141 are linked, reducing the pressure in crank chamber 12. Reduced pressure in crank chamber 12 causes the inclined angle of slant plate 40 with respect to a plane perpendicular to the longitudinal axis of drive shaft 15 to be increased, thereby increasing the displacement of the compressor. However, if the pressure in crank chamber 12 is reduced to a value below the predetermined value, bellows member 71a expands, and valve element 71b is moved to the right, closing hole 211. Thus, the link between crank chamber 12 and suction chamber 141 is terminated. As a result, the suction pressure has no effect on the inclined angle of slant plate 40, and the inclined angle of slant plate 40 is directly controlled by changes of the pressure in crank chamber 12 due to blowby gas from the cylinders to thereby vary the displacement capacity of the compressor.

This inventoin has been described in detail in connection with the preferred embodiment. This embodiment, however, is merely for example only and the invention is not restricted thereto. It will be understood by those skilled in the art that other variations and modifications can easily be made within the scope of this invention as defined by the appended claims.

I claim:

1. In a slant-plate type compressor, said compressor comprising a compressor housing including a cylinder block, said cylinder block including a plurality of peripherally disposed cylinders and a central bore formed therethrough, a crank chamber enclosed within said cylinder block at a location forward of said cylinders, said compressor housing including a suction chamber and a discharge chamber formed therein, a piston slidably fitted within each of said cylinders, a drive mechanism coupled to said pistons to reciprocate said pistons within said cylinders, said drive mechanism including a drive shaft rotatably supported in said housing, an inner axial end surface of said drive shaft rotatably supported in said central bore, said drive mechanism further including coupling means for coupling said drive shaft to said pistons such that rotary motion of said drive shaft is converted into reciprocating motion of said pistons in said cylinders, said central bore further including a rearward portion having a threaded interior surface, said compressor further including an adjustable screw member screwed into said threaded rearward portion of said central bore, said inner axial end surface of said drive shaft disposed adjacent said screw member, the axial position of said screw member adjustable by rotating said screw member in said threaded portion to thereby adjust the axial position of said drive shaft within said central bore, the improvement comprising:

a rotation preventing means for preventing rotation of said screw member due to rotation of said drive shaft, said rotation preventing means including a spacing member disposed between said inner axial end surface of said drive shaft and said screw member, said spacing member including at least one radial projection formed at a peripheral surface thereof, said rotation preventing means further including at least one depression formed on an interior surface of said central bore and corresponding to said radial projection of said spacing member, said radial projection fitting into said depression to prevent rotation of said spacing member and further preventing rotational motion of said drive shaft from being transferred to said screw member.

2. The compressor recited in claim 1, said spacing member comprising an essentially circular disk, said at least one radial projection comprising at least two semi-circular shaped radial projections projection from opposite peripheral surfaces of said circular disk, said at least one depression including two semi-circular shaped depressions formed on opposite interior surfaces of said central bore and corresponding to said projections of said spacing member.

3. The compressor recited in claim 1, said coupling means further including a cam rotor fixed to said drive shaft and rotatable therewith, a slant plate disposed on said drive shaft, said slant plate fixed to said cam rotor and rotatable therewith, and a wobble plate nutatably disposed on said slant plate, said wobble plate connected to said pistons via a plurality of connecting rods, rotation of said drive shaft causing corresponding nutational motion of said wobble plate to reciprocate said pistons in said cylinders.

4. The compressor recited in claim 3, said slant plate fixed to said cam rotor by a hinge, said hinge allowing adjustment of the angle of inclination of said slant plate with respect to said drive shaft.

5. The compressor recited in claim 4 further comprising variable capacity means for varying the displacement capacity of said compressor in response to the crank chamber pressure.

6. The compressor recited in claim 5, said cylinder block including a hollow portion formed therein, and a radial passage linking said hollow portion to a rear chamber of said central bore, said hollow portion also linked to said suction chamber, said drive shaft further including an interior passage terminating at one end in said crank chamber and at an opposite end in said rear chamber to link said crank chamber and said suction chamber, and said variable capacity means including a valve mechanism disposed in said hollow portion and responsive to the crank chamber pressure to open and close the link between said crank chamber and said suction chamber.

7. The compressor recited in claim 1, said housing further including a front end plate disposed on an open end of said cylinder block, and a rear end plate disposed on an opposite end of said cylinder block from said front end plate, said front end plate enclosing said crank chamber within said cylinder block, said suction chamber and said discharge chamber formed in said rear end plate.

* * * * *